June 1, 1926.
M. BLUMENSCHEIT
1,586,598
HEAT RETAINER FOR AUTOMOBILE ENGINES
Filed April 9, 1923
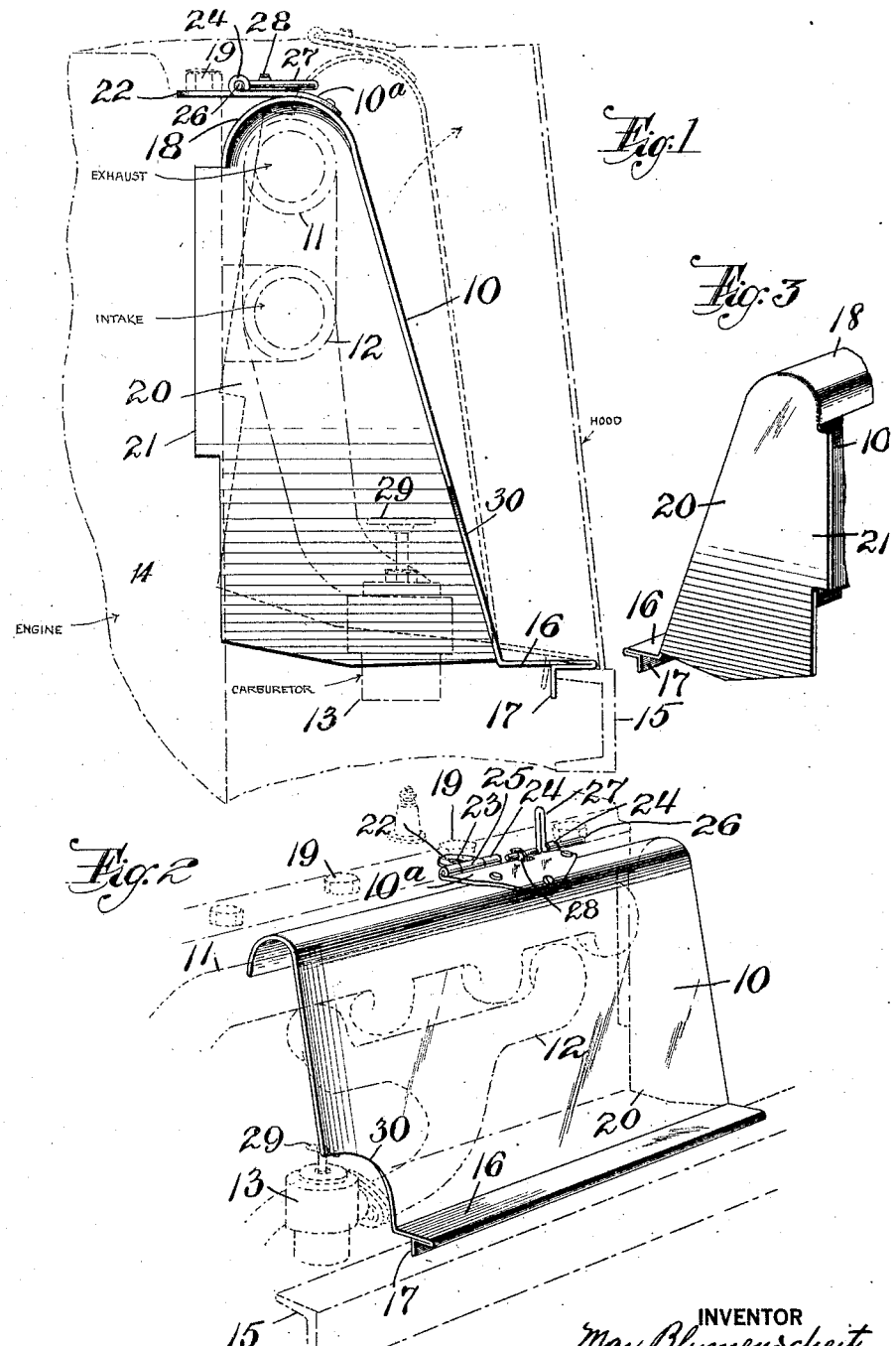
INVENTOR
Max Blumenscheit,
BY
Wm H Canfield
ATTORNEY Patented June 1, 1926.

1,586,598

UNITED STATES PATENT OFFICE.

MAX BLUMENSCHEIT, OF PORT MONMOUTH, NEW JERSEY.

HEAT RETAINER FOR AUTOMOBILE ENGINES.

Application filed April 9, 1923. Serial No. 630,713.

This invention relates to an improved heat retainer to be mounted alongside an automobile engine so as to confine the heat from the engine and from the exhaust manifold so that the intake pipe and the carburetor are kept warm, these parts being also protected from the draught from the fan mounted on the front of automobile engines.

The invention consists of a shield which is rigidly held in place by a detachable means so that, when desired, the shield can be readily detached and removed without the use of any tools.

The invention is further designed to provide a device of this kind which gives ready access to the carburetor so that the shield need not be removed for adjustment of the carburetor, and in addition one which is economically manufactured and which can be readily installed and removed in and from an automobile engine.

The invention is illustrated in the accompanying drawing, in which Figure 1 is an edge view of the shield, part of the frame or chassis of an automobile and part of the engine being illustrated by broken lines, the shield being shown in dotted outline to indicate the ease of removal. Figure 2 is a perspective view showing the shield in position, and Figure 3 is a perspective view of the front part of the shield.

The heat retainer comprises a shield 10 which is usually made of sheet metal and is usually of a length to extend from the front edge of the engine to the rear thereof so as to enclose the intake manifold and carburetor, and fits over the top of the exhaust manifold. This will be seen readily from Figure 2, in which 11 indicates the exhaust manifold, 12 the intake manifold and 13 the carburetor, all these being accessories to the engine 14.

The bottom end of the shield is made so that it is supported on the frame or chassis 15 of the automobile, and the preferred form of forming this supporting bottom edge is to form it with a flange 16 which, to prevent outward movement thereof and to insure it against rattling, is provided with a lip 17. The top of the shield is turned over, as at 18, so as to enclose and to be spaced from the exhaust manifold, this usually being done by simply curving the top edge of the shield 10 so that the top part of the curve is approximately even with the top of the outer edge of the cylinder head, these cylinder heads being held down by bolts 19.

The shield has at the front end a wall 20 with a lip 21 which is extended slightly to rest against the front end of the engine. This front wall 20 shields the manifolds and the carburetor from the blast from the cooling fan which is situated in automobiles between the radiator and the engine.

It will thus be seen that the shield is readily removable at its bottom end, and to make it secure and at the same time readily removable I provide it with suitable means for attaching it normally rigidly to the engine, but making it quickly releasable without the use of tools. The form illustrated comprises a clip 22 which is provided with a hole 23 so that one of the bolts 19 of the cylinder head is removed, the clip put in position and then the bolt 19 again screwed down in place and the clip is thus permanently attached to the engine.

A detachable connection between the shield and the clip is provided, which in the form shown comprises a plate $10^a$ fastened to the shield and provided with knuckles 24 which are spaced apart to a considerable extent so that the knuckle 25 on the end of the clip can be placed between them, and the outermost of the knuckles 24, with the central knuckle 24, can normally support in its withdrawn position the pintle 26 which is usually made of wire and can be slid longitudinally in the knuckles, but is limited in its movement by the projecting handle 27, usually formed by doubling the wire.

It will thus be seen that when the pintle is slid back, as shown in Figure 2, the shield can be readily removed in the direction of the arrow in Figure 1, the shield being shown in dotted outline as being removed, that is, tilted away from the engine and then lifted from the chassis 15.

When the shield is to be replaced, its bottom edge is rested on the chassis and then it is swung in until its top edge is situated so that the knuckles 24 are in line with the knuckle 25 on the clip, then the handle 27 is used to slide the pintle 26 so that it passes through the knuckle 25, and it can then be swung down to the position shown in Figure 1, and a small lip 28 is struck up from the plate $10^a$ and acts as a catch onto which the handle 27 is caught, which prevents any accidental raising of the handle 27, thus insuring the pintle against being slid to its open position due to the vibration of the car.

To permit access to the adjusting screw 29 on the top of the carburetor I preferably cut the lower rear edge of the shield away, as shown at 30, to permit the fingers to be inserted to operate the adjusting screw 29.

It will thus be evident that no tools are necessary in installing or removing the heat retainer, and when made of sheet metal the whole device is so light that it adds no appreciable weight to the car.

Minor details can be changed without departing from the scope of the invention.

I claim:

A heat retainer for automobiles comprising a sheet of metal extending from the top of the engine to the side frame of the chassis and having a bottom flange to rest on the frame and a lip to engage the side of the frame to prevent side movement of the bottom, the top of the sheet having a curved part to go over the manifold, a detachable means for securing the curved top to the top of the engine, and a front wall on the retainer and extending from the sheet aforesaid to the side of the engine.

In testimony that I claim the foregoing, I have hereto set my hand, this 2nd day of April, 1923.

MAX BLUMENSCHEIT.